United States Patent [19]

Miki et al.

[11] Patent Number: 4,632,510
[45] Date of Patent: * Dec. 30, 1986

[54] MOUNTING AND DEMOUNTING DEVICE OF OPTICAL UNIT

[75] Inventors: Yukio Miki; Takeshi Egawa, both of Osaka, Japan

[73] Assignee: Minolta Camera Kabushiki Kaisha, Osaka, Japan

[*] Notice: The portion of the term of this patent subsequent to May 22, 2001 has been disclaimed.

[21] Appl. No.: 739,000

[22] Filed: May 29, 1985

Related U.S. Application Data

[63] Continuation of Ser. No. 379,719, May 19, 1982, Pat. No. 4,534,621.

[30] Foreign Application Priority Data

May 21, 1981 [JP] Japan .................................. 56-77518

[51] Int. Cl.⁴ .......................... G02B 7/04; G02B 7/08
[52] U.S. Cl. .................................................. 350/257
[58] Field of Search ............... 350/255, 257, 429–430; 354/195.1, 286, 400, 486

[56] References Cited

U.S. PATENT DOCUMENTS

| | | | |
|---|---|---|---|
| 2,319,083 | 5/1943 | Nowack et al. | 350/255 |
| 3,709,129 | 1/1973 | Lange | 350/255 |
| 4,168,892 | 9/1979 | Ueda et al. | 354/486 |
| 4,413,894 | 11/1983 | Miki et al. | 350/255 |
| 4,449,807 | 5/1984 | Miki et al. | 354/195.1 |
| 4,534,621 | 8/1985 | Miki et al. | 350/257 |

Primary Examiner—William H. Punter
Attorney, Agent, or Firm—Watson, Cole, Grindle & Watson

[57] ABSTRACT

An optical unit for use with interchangeable lenses is provided with a mounting and demounting device which includes a mount positioning member, a lock member for locking the mount positioning member at a retracted position, and a mount releasing member for retracting the mount positioning member to the non-projected position. The mount positioning member is urged to project and engageable with a positioning recess of an interchangeable lens. The locking member is provided with a detection means which causes the locking member to release the mount positioning member by detecting completion of mounting of an interchangeable lens on the optical unit.

4 Claims, 6 Drawing Figures

MOUNTING AND DEMOUNTING DEVICE OF OPTICAL UNIT

CROSS REFERENCE TO RELATED APPLICATION

This application is a continuation application of application Ser. No. 379,719, filed May 19, 1982, now U.S. Pat. No. 4,534,621.

BACKGROUND OF THE INVENTION

1. Field of the Invention

The present invention relates to a mounting and demounting device of an optical unit for use with interchangeable optical instruments, which device is used for mounting and demounting of an interchangeable optical instrument such as an interchangeable lens on and from a body proper of the optical unit.

2. Description of the Prior Art

A camera of lens interchangeable type is provided with a positioning member for positioning an interchangeable lens in place on the camera body and locking the interchangeable lens at a predetermined angular position. This positioning member is constantly urged by a spring in a projecting direction, hence the normal mounting operation cannot be proceeded with unless the interchangeable lens is pushed against a mount face spring of the camera body with a force enough to overcome such spring urge over the entire moving stroke of the positioning member. This is disadvantageous in that turning the interchangeable lens forcibly with an insufficient pushing force applied toward the camera body will possibly cause damage to bayonet pawls for mounting. Additionally, keeping the positioning member pressed with a sufficient force during a mounting and demounting operation is unpleasant or even painful to the camera user. Moreover, when mounting an interchangeable lens to the camera body or demounting it therefrom, a strong contact takes place between the positioning member and a mounting face of the interchangeable lens to possibly cause damage to either or both thereof.

With an auto-focusing camera in which a drive means for focusing includes a driving shaft interlocked with the positioning member with a given positional relationship and engageable with a driven shaft on the side of an interchangeable lens, there is a possibility that, when an interchangeable lens is mounted in haste, etc., the positioning member fails to be properly engaged in a mating groove on the interchangeable lens side, being half-inserted. Should it occur, the driving shaft and the driven shaft on the camera side and the interchangeable lens side cannot be properly engaged either. In order to cope with such an unfavorable condition, it is required to further strengthen the spring urge for the positioning member in a camera of this type and the abovementioned disadvantages become more remarkable.

SUMMARY OF THE INVENTION

It is an object of the present invention to provide a mounting and demounting device of an optical unit for use with interchangeable optical instruments such as an interchangeable lenses, which eliminates the disadvantages mentioned above, which enables smooth and easy mounting or demounting and which is safe from damage caused by strong contact of a positioning member on a mount face of an interchangeable optical instrument in the process of mounting or demounting.

BRIEF DESCRIPTION OF THE DRAWINGS

FIGS. 3 through 6 show a preferred embodiment of the present invention, wherein:

FIG. 3 is a partial sectional view of a camera body.

FIG. 4 is a partially sectioned view of the camera body with an interchangeable lens mounted on the camera body.

FIGS. 5 and 6 are partially cross-sectional views taken along the line A—A of FIG. 4, wherein:

FIG. 5 shows the state when mounting of the interchangeable lens is just started.

FIG. 6 shows the state when mounting of the interchangeable lens is completed.

DESCRIPTION OF THE PREFERRED EMBODIMENTS

Figure 1:
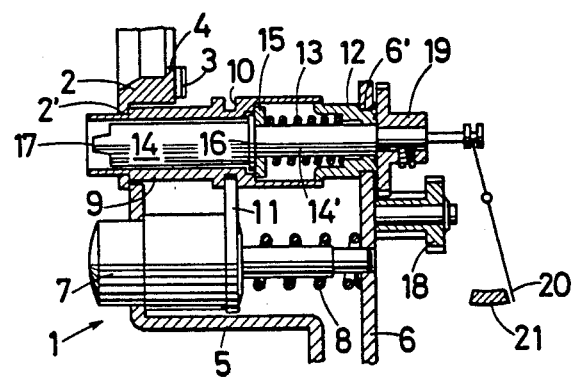
FIGS. 1 and 2 are longitudinal sectional views of essential parts of an embodiment disclosed in a copending U.S. patent application Ser. No. 366,323 by the same inventors, filed on Apr. 7, 1982 and titled "Interchangeable Type Optical Unit in Optical System" (assigned to the same assignee), now U.S. Pat. No. 4,449,807.
Figure 2:
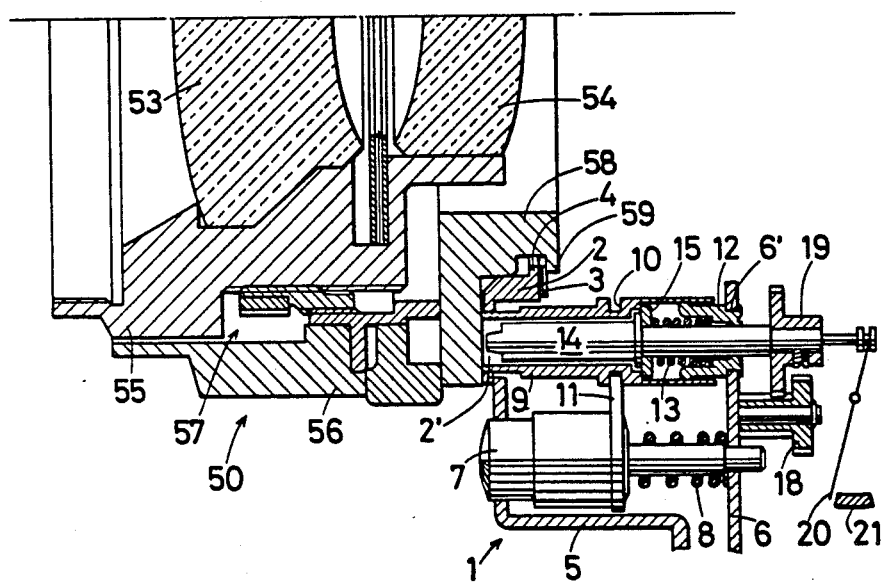

Referring to FIGS. 1 and 2, a mount ring member 2 of a camera body 1 on which the interchangeable lens 50 is mounted is provided with bayonet pawls 4 and bayonet springs 3. An operating member 7 partly projecting out of a front wall plate 5 of the camera body 1 is held through a supporting hole in the front wall plate 5 and a hole in a front base plate 6 and is constantly urged by a spring 8 to be kept projecting forward through the front wall plate 5.

An engaging plate 11 is fixedly secured to the operating member 7, and is engaged in a groove 10 of the mount positioning member 9. Hence, the operating member 7 is capable of shifting together with the mount positioning member 9 as a unit. The mount positioning member 9 is cylindrical and movable forward and back with its front portion being guided by a through-hole 2' in the mount ring member 2 and its rear end portion being guided by the outer periphery of a bearing member 12 of a driving shaft 14. The bearing member 12 is fixedly inserted in hole 6' in the front base plate 6. The driving shaft 14 receives a driving force from a motor (not shown) and drives a driven shaft 51 (shown in FIG. 4) of the interchangeable lens (FIG. 2) for shifting the lens system of the interchangeable lens 50. 15 is a movable flange which loosely fits on the rear-half diameter reduced portion 14' of the driving shaft 14 and is kept urged toward the left on the drawing by a spring 13 provided between the movable flange and the bearing member 12. A fixed flange 16 is secured to the driving shaft 14. As the flange 16 is pressed by the movable flange 15, the driving shaft 14 is moved toward the left on the drawing by the force of the spring 13. A clutch pawl 17 formed at the front end of the driving shaft 14 is engageable with the mating recess 52 (see FIG. 4) of the driven shaft 51 of the interchangeable lens 50 upon completion of mounting of the interchangeable lens 50 on the camera body 1. The motor (not shown) drives the gear 18 (not shown in FIGS. 3 and 4 for brevity, but which is identical to the gear 18 shown in FIGS. 1 and 2) on the front base plate 6 through a not shown interchangeable train of gears and a gear 19 meshed with gear 18 and fixedly secured to the driving shaft 14.

A swingable tongue 20 and a fixed contact 21 constitute a switch in a drive circuit for the motor (not shown). The swingable tongue 20 is swung as the driving shaft 14 is shifted forward and back and contacts the fixed contact 21 when the interchangeable lens 50 is mounted in place by means of the mount positioning member 9. In response to this contacting, the motor (not shown) starts rotating.

The interchangeable lens 50 includes a front lens group 53 and a rear lens group 54, which are both fixed in an inner barrel 55. Between an outer barrel of the interchangeable lens and the inner barrel 55 there is provided a driven shaft 51 (see FIG. 4) which is interlocked with a lens shifting mechanism 57. 58 is an annular seat member of the interchangeable lens 50 and 59 is a bayonet pawl. The annular seat member 18 is formed with a through-hole 58' through which the driven shaft 51 extends in the direction of the optical axis of the interchangeable lens. Details of the designs shown in FIGS. 1 and 2 are disclosed in the specification of U.S. Pat. No. 4,449,807 referred to above. With no interchangeable lens 50 mounted as in FIG. 1, the mount positioning member 9 is kept projecting out of the mount ring member 2 by springs 8 and 13. When, for mounting the interchangeable lens 50, the operating member 7 is depressed with a finger or the mount positioning member 9 is pushed by the lens annular seat member 58 into the mount ring member 2 against the forces of the spring 8 and 13, then the annular seat member 58 with the bayonet pawls 59 of the interchangeable lens 50 can be turned in close contact with the mating mount ring member 2 of the camera body.

By this the bayonet pawls 4 and 59 are engaged for connection to be established between the camera body 1 and the interchangeable lens 50, and the mount positioning member 9 of the camera body 1 is engaged into the positioning recess 60 of the interchangeable lens 50 (See FIG. 4.) to complete the lens mounting operation.

In the operation of mounting the interchangeable lens described above, it is necessary to push the mount positioning member 9 into the mount ring member 2 over the entire moving stroke thereof, and this is troublesome and inconvenient. Furthermore, since the springs 8 and 13 press the mount positioning member 9 against the annular seat member 58 of the interchangeable lens 50 with a strong force as the latter is turned, both members 9 and 58 are likely to be subjected to damage by friction and also unpleasant is the feeling of the mounting and demounting operation. This is more or less the same even in the absence of the driving shaft 14.

In contrast thereto, the mounting and demounting device of the present invention employs a novel mechanism as described below.

Figure 3:
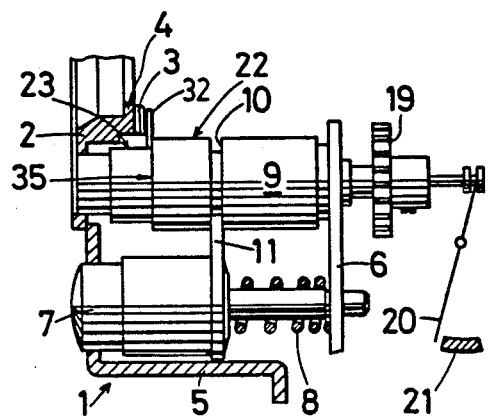
Figure 4:
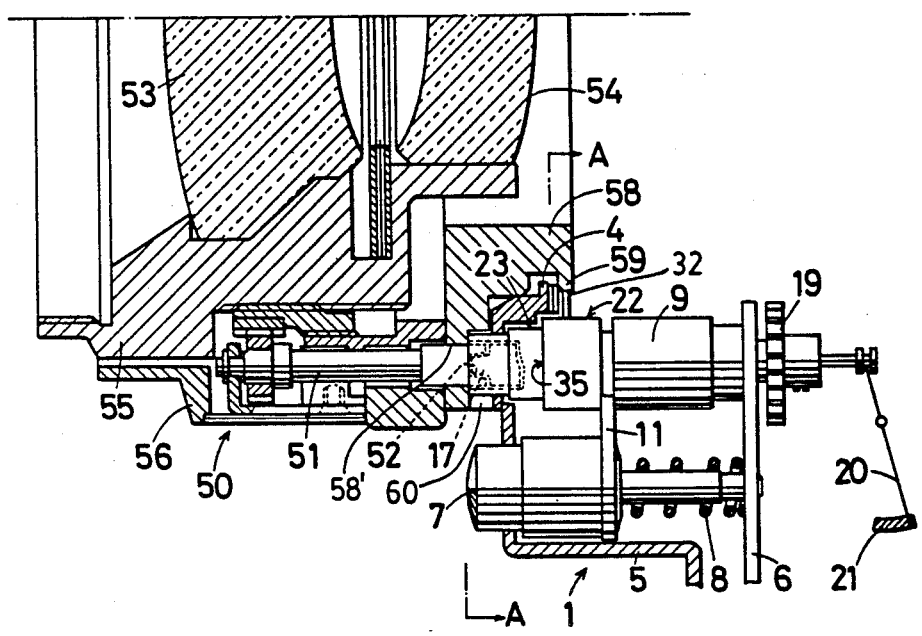
Figure 5:
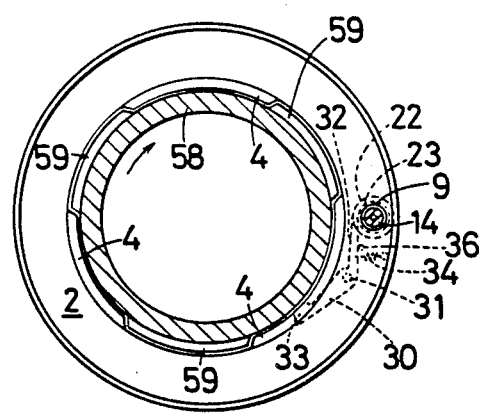
Figure 6:
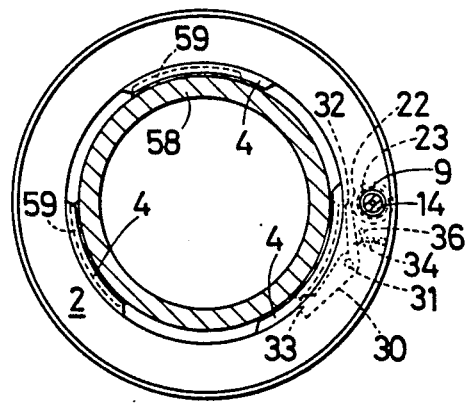

Referring now to FIGS. 3 through 6 in which like parts are referred to by like numerals used in FIGS. 1 and 2 for convenience's sake, adopted is a mechanism in which the mount positioning member 9 together with the driving shaft 14 is kept retracted in the mount ring member 2 except when it is required for positioning the interchangeable lens 50. The members and elements constituting this mechanism are referred to by numerals on the order of 30. A locking member 30 is pivoted on a pin 31 extending from a fixed member (not shown) (FIGS. 5 and 6). One end of the locking member 30 constitutes a locking portion 32, which is in contact or engaged with the mount positioning member 9. The other end of the locking member 30 constitutes a detecting portion 33 which is in contact with the outer periphery of the annular seat member 58 or the bayonet pawl 59 of the interchangeable lens 50.

An urging spring 34 (which may as well be substituted with a torsion spring, leaf spring or the like) constantly urges the locking member 30 in the clockwise direction as shown in FIG. 5. A stepped locking portion 35 is provided on the outer periphery of the mount positioning member 9 together with the driving shaft 14. The mount positioning member 9 is prevented from projecting beyond the mount ring member 2 when this stepped locking portion 35 is engaged with the locking portion 32 of the locking member 30. On the outer periphery of the mount positioning member 9 are formed a large diameter portion 22 and a small diameter portion 23 with this stepped locking portion 35 as the border. 36 is a stopper of the locking member 30.

Now explanation is given of mounting and demounting of the interchangeable lens 50. For demounting the interchangeable lens 50 from the camera body 1, first the operating member 7 in the "mounting over" position shown in FIG. 4 is pushed toward the right as indicated in FIG. 4. The mount positioning member 9 is thereby caused to retract into the mount ring member 2 together with the driving shaft 14, whereby the mount positioning is released and the shaft connection for driving is disconnected. When turning of the interchangeable lens 50 in the demounting direction is now started, the detecting portion 33 which has been in contact with the bayonet pawl 59 to release the locking of the mount positioning member 9 by the locking portion 32 becomes rotatable clockwise as shown in the figure. The stepped locking portion 35 has been already retracted to the same position as shown in FIG. 3, hence the locking portion 32 of the locking member 30 is slipped onto the small diameter portion 23 by the force of the urging spring 34 and the mount positioning member 9 would not be projected together with the driving shaft if the operating member 7 is released. The interchangeable lens 50 can be demounted by further turning it. FIG. 3 shows the state with the locking portion 32 of the locking member slipped onto the stepped locking portion 35, and in this state the mount positioning member 9, loaded by the spring 8 and the spring 13 (not shown in FIGS. 3 and 4 because it is housed in the mount positioning member 9, but which is identical with the spring 13 shown in FIGS. 1 and 2), would not project beyond the mount ring member 2.

For mounting the interchangeable lens 50, first the annular seat member 58 of the interchangeable lens 50 together with the driving shaft is brought into close contact with the mating mount ring member 2 of the camera body 1 (this requires practically no effort in the absence of the pushing force of the mount positioning member 9), and then the interchangeable lens 50 is turned in the direction indicated by the arrow in FIG. 5.

FIG. 5 shows the state with the interchangeable lens 50 in close contact with the camera body 1 but not turned yet. In this state the bayonet pawl 59 of the annular seat member 58 of the interchangeable lens 50 is, naturally, still out of engagement with the mating bayonet pawl 4 of the mount ring member 2 of the camera body 1. Also, the locking member 30 has its locking portion 32 on the side of the small diameter portion of the mount positioning member 9. When the interchangeable lens 50 is now turned as aforesaid, the bayonet pawl 59 of the interchangeable lens 50 comes into engagement with the bayonet pawl 4 of the camera body 1 and a little before (or simultaneously with) completion of turning (see FIG. 6), the outer periphery of the bayonet pawl 59 of the interchangeable lens 50 comes into contact with the detecting portion 33 of the locking member 30 and pushes it. The locking member 30 is thereby rotated counterclockwise to disengage locking portion from the stepped locking portion 35 (see FIG. 6.), hence the mount positioning member 9 under the urging forces of the springs 8 and 13 gets into the positioning recess in the annular seat member 58 of the interchangeable lens 50 together with the driving shaft 14 when it is turned to the proper position and thus positioning of the mounted interchangeable lens 50 is completed. (See FIG. 4).

Although the camera body 1 according to the above embodiment of the present invention has driving shaft 14, the present invention is also applicable to optical units having no driving shaft. The mounting and demounting device of the present invention is useful as well for a camera with a system of transmitting electrical or mechanical signals between the interchangeable lens and the camera body and ON/OFF thereof interlocked with the mount positioning member, and still more marked is the usefulness of the device of the invention especially when electrodes constitute a signaling means. Also, while both detecting and releasing means are mechanical in the preferred embodiment shown, they can as well be electrical so that, for instance, the progress of rotation of the interchangeable lens as it is mounted or demounted is detected electrically and the result is input to an electromagnetic drive unit for actuating the locking member.

Further, while in the preferred embodiment of the present invention explanation was made with the mount positioning member 9 as prevented from projecting in the course of mounting or demounting, the object of the present invention is half accomplished even if it is somewhat projected in said course, hence the device of the invention is useful also in such a case. Furthermore, the object of the present invention is almost accomplished also when locking is released substantially prior to completion of rotation for mounting of the interchangeable lens 50, hence the device of the invention is useful in such a case as well, and all such cases are within the scope of the present invention.

According to the present invention, an interchangeable lens is safe from being affected by either the mount positioning member or any other member interlocked therewith, hence no strong pressing effort is required, remarkably facilitating mounting operation and demounting operation. The mounting operation and the demounting operation are facilitated as well, because the mount positioning member and the driving shaft interlocked with the positioning member are kept locked until the mounting operation is almost completed upon mounting of the interchangeable lens) and until a moment immediately after the start of the demounting operation (upon demounting of the interchangeable lens). Furthermore, the interchangeable lens is practically or entirely safe from any strong contact with the mount positioning member, etc., during the mounting operation and the demounting operation, hence there is no risk of damage to either caused thereby, and improved are the feeling of the mounting operation and the demounting operation as well.

Meanwhile, it should be understood that the positioning member 9, lock member 30 and the operating member 7, etc., may be provided on an interchangeable lens 50, when the mating recess 52 is provided on the camera body 1.

What is claimed is:

1. An engaging and disengaging device for an optical main instrument which includes a rotatable driving shaft and an interchangeable optical instrument which is mountable on and demountable from said optical main instrument by rotation thereof relative to said optical main instrument and which includes a rotatable driven shaft engageable with said driving shaft and a focusing optical system connected with said driven shaft, said device comprising a first mount member of said interchangeable optical instrument, formed with a first mount face and a first through-hole through which said driven shaft extends in the direction of the optical axis of said interchangeable optical instrument, a second mount member of said optical main instrument, formed with a second mount face and a second through-hole through which said driving shaft extends in the direction of the optical axis of said optical main instrument, said second mount face being brought into contact with said first mount face with said interchangeable optical instrument mounted on said optical main instrument, an urging means for urging said driving shaft from a retracted position where said driving shaft retracts behind or projects a little behind said second mount face to a projecting position where said driving shaft projects largely beyond said second mount face, said driving shaft being engageable with said driven shaft when moved to said projecting position, a locking means capable of locking said driving shaft in its retracted position against the action of said urging means, and a detection means for detecting the state of the mounting and demounting of said interchangeable optical instrument on and from said optical main instrument to automatically release the locking of said driving shaft by said locking means immediately prior to completion of the mounting until immediately after start of the demounting.

2. An engaging and disengaging device as defined in claim 1, further comprising an operating member which is manually operable and means for restoring said driving shaft from said projecting position to said retracted position in response to a manual operation of said operating member so that said driving shaft can be locked in said retracted position again by said locking means.

3. An engaging and disengaging device as defined in claim 2, further comprising a positioning member extending through said second through-hole of said second mount member coaxially with said driving shaft so as to be movable between a projecting position where it projects largely beyond said second mount face and a retracted position where it projects a little behind or retracts behind said second mount face, wherein said first mount member is formed with a positioning recess in which said positioning member being in its projecting position is engageable with the mounting completed, said urging means includes an urging member which urges said driving shaft and said positioning member together from their retracted positions to their projecting positions, said positioning member includes means for holding said driving shaft in its retracted position when said positioning member is in its retracted position, and said locking means includes a locking member which directly locks said positioning member in its retracted position against the action of said urging member to thereby lock said driving member in its retracted position through cooperation with said holding means, said locking member being disabled by said detection means to automatically release the locking of said positioning member and the locking of said driving shaft immediately prior to completion of the mounting until immediately after start of the demounting.

4. An engaging and disengaging device as defined in claim 2, wherein said optical main instrument is a camera body and said interchangeable optical instrument is an interchangeable lens.

* * * * *